No. 729,248. PATENTED MAY 26, 1903.
H. YEAGER & J. W. RIGNEY.
METHOD OF MAKING BLOCK ICE CREAM.
APPLICATION FILED MAR. 3, 1903.

NO MODEL.

Witnesses.                                                Inventors

No. 729,248.

Patented May 26, 1903.

UNITED STATES PATENT OFFICE.

HENRY YEAGER AND JAMES W. RIGNEY, OF TERRE HAUTE, INDIANA.

METHOD OF MAKING BLOCK ICE-CREAM.

SPECIFICATION forming part of Letters Patent No. 729,248, dated May 26, 1903.

Application filed March 3, 1903. Serial No. 145,891. (No specimens.)

*To all whom it may concern:*

Be it known that we, HENRY YEAGER, a subject of the Emperor of Germany, and JAMES W. RIGNEY, a citizen of the United States, both residing at Terre Haute, in the county of Vigo and State of Indiana, have invented certain new and useful Improvements in Methods of Making Block Ice-Cream, of which the following is a specification.

Our invention relates to the making of ice-cream in the shape of blocks in which a design consisting of a numeral, letter of the alphabet, symbol, &c., of a contrasting color of cream is formed in the center of the block.

Heretofore in making block cream of variegated colors it has been the custom to devise pleasing effects by making what is known as "Neapolitan" cream by placing cream and ices of varied flavors and colors in the block-mold before freezing solid. Block cream has also been made with a design through its center by building up the block with the design by the use of templets of the necessary pattern to cut the design desired. This method is not only expensive because of the time consumed in making the block, but is unsatisfactory because of the danger of the frozen cream melting during the operation, so that when refrozen in the block-mold the melted portions would form in lumps and the value of the product be impaired.

The object of our invention is to remedy these defects by first solidifiying the cream to form the desired design in a mold of the required shape, and then placing the molded cream in the mold for forming the block, then filling the block with cream of a contrasting color to the cream forming the design, and then refreezing the cream in the block-mold. By this method the cost of the product is cheapened and at the same time its flakiness is retained.

The advantages of our invention will more fully appear hereinafter and by reference to the accompanying drawings, in which—

Figure 1:
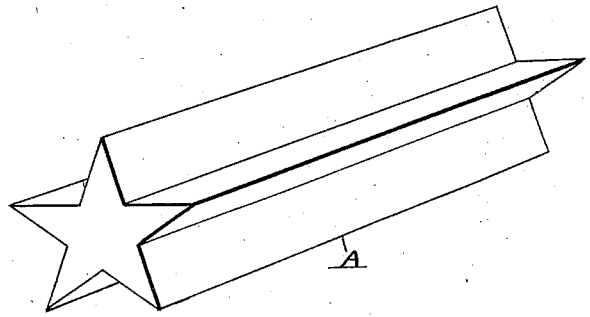
Figure 2:
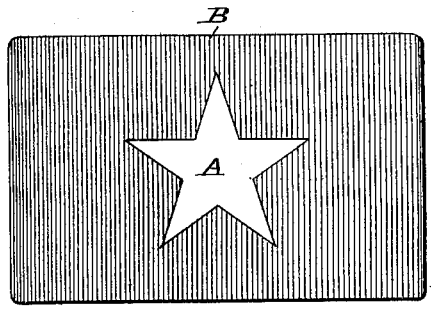

Figure 1 represents a bar of cream frozen in a mold of the contour desired, being the first step in our invention; and Fig. 2, a view of the finished block of cream with the design shown in its center.

Referring to the drawings, in which similar reference characters indicate corresponding parts throughout the several views, A represents a bar of cream, which has been solidified in a mold of the shape desired, in this instance being the shape of a five-pointed star, and made of any desired flavor or color— for instance, orange water-ice—which would produce a star of a nearly-golden sheen. The block A after freezing is then placed in a partly-filled mold of, say, green pistache ice-cream B. The mold is then completely filled with the cream and placed in the freezer and allowed to become hardened. When cut into blocks for serving, each block will consist of a green outline and a yellow star interior.

The mold used for making the bar, star-shaped in cross-section, is subject-matter for a companion application, filed March 3, 1903, and given Serial No. 145,892. It will, however, be understood that any other symbol— such as a heart, crescent, &c.—or a numeral or letter or other character may be employed instead of the star, and any desired combination of flavors and colors used in the place of the stated combination of pistache-cream and orange-ice without departing from the spirit of our invention. It will also be readily understood that the subject-matter of our invention may be applied to making other food products, such as candies and other substances of a plastic nature.

Having thus described our invention, what we claim is—

1. The method of making block ice-cream consisting of forming a bar of ice-cream of any desired configuration, placing said bar in a mold for forming the block of cream, filling the mold with ice-cream, and then solidifying the cream in said block-mold, substantially as shown and described.

2. The method of making block ice-cream consisting of molding a bar of cream into the desired configuration, placing said molded bar in a block-mold, filling said block-mold with other ice-cream, and then solidifying the cream in said block-mold, substantially as shown and described.

3. The method of making block ice-cream consisting of, first filling a mold of the desired configuration with a selected cream, solidifying the cream in said mold, removing said solidified and molded cream and placing it in a block-mold partly filled with ice-cream, then filling the block-mold, and finally solidifying the cream in said block-mold, substantially as shown and described.

4. The method of making block ice-cream consisting of, first filling a mold of the desired configuration with a selected cream, solidifying the cream in said mold, removing said solidified and molded cream and placing it in a block-mold partly filled with ice-cream of a contrasting color therewith, then filling said block-mold with said contrasting colored cream, and finally solidifying the cream in said block-mold to a single compact block, substantially as shown and described.

In testimony whereof we hereto affix our signatures in the presence of two witnesses.

HENRY YEAGER.
JAMES W. RIGNEY.

Witnesses:
EDSIL BOSSTICK,
NORMAN BINDLEY.